A. B. TERRIL & M. CANNING.
BEEF JACK.
APPLICATION FILED APR. 5, 1909.
1,051,780.
Patented Jan. 28, 1913.
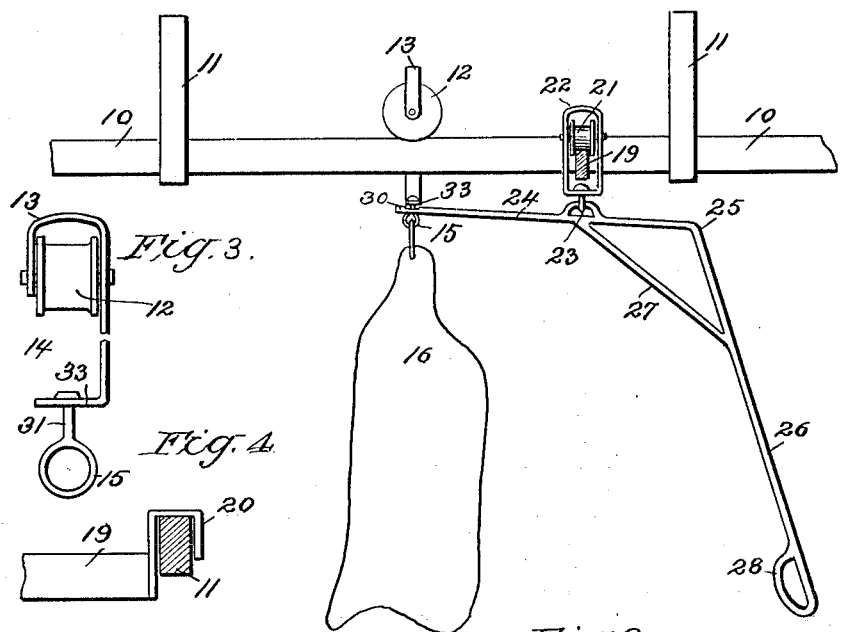
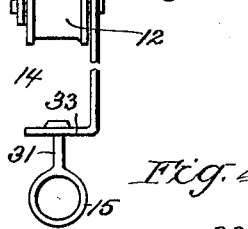
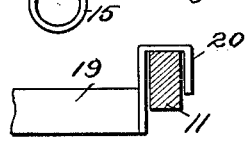
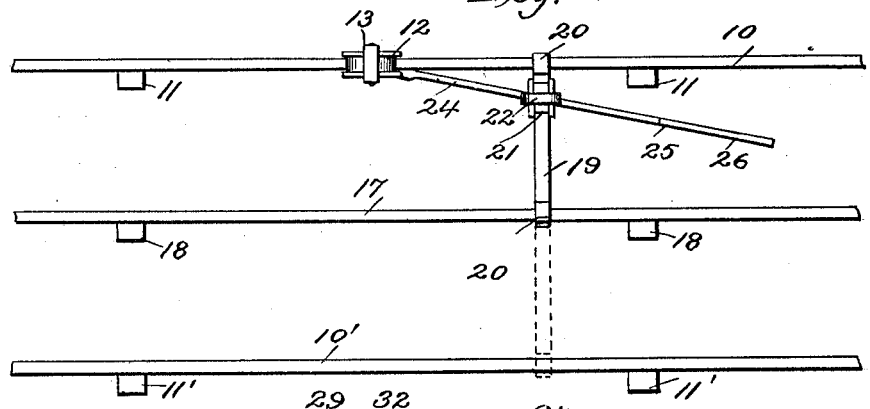
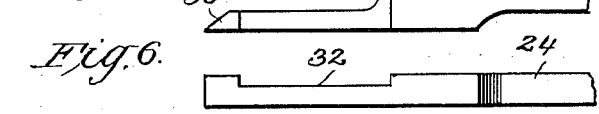
Witnesses
H. Strauss
S. L. Richmond
Inventors
Amos B. Terril and
Michael Canning,
By Mason Fenwick & Lawrence,
Attorneys

UNITED STATES PATENT OFFICE.

AMOS B. TERRIL AND MICHAEL CANNING, OF DENVER, COLORADO.

BEEF-JACK.

1,051,780.  Specification of Letters Patent.  Patented Jan. 28, 1913.

Application filed April 5, 1909. Serial No. 487,937.

*To all whom it may concern:*

Be it known that we, AMOS B. TERRIL and MICHAEL CANNING, citizens of the United States, residing at Denver, in the county of Denver and State of Colorado, have invented certain new and useful Improvements in Beef-Jacks; and we do hereby declare the following to be a full, clear, and exact description of the invention, such as will enable others skilled in the art to which it appertains to make and use the same.

This invention relates to beef jacks, and has for an object to provide a device for use in beef storage ware houses adapted to lift beef from storage track onto transporting track.

A further object of the invention is to provide a short-length of track adapted to span the interval between the storage and transporting track in a meat storage ware house with a carriage adapted to run upon the said short-length track and a lever carried by said carriage adapted to engage with and lift the weight suspended thereon.

With these and other objects in view, the invention comprises certain novel constructions, combinations and arrangements of parts, as will be hereinafter fully described and claimed.

In the drawings:—Figure 1 is a view of the improved jack in side elevation with the short length of track shown in transverse section. Fig. 2 is a top plan view of adjacent storage track and central transporting track with the jack mounted to lift meat from one storage track to the transporting track. Fig. 3 is a transverse, sectional view of one of the tracks with the detail of the supporting member carried by the short track section. Fig. 4 is a view in side elevation of the truck or roller ordinarily employed upon such tracks. Fig. 5 is a top plan view of the extremity of the weight-engaging lever. Fig. 6 is a view in edge elevation of the extremity as shown at Fig. 5.

Like characters of reference designate corresponding parts throughout the several views.

It is well known that meat, especially beef, is stored in cold storage ware houses suspended from pulleys having hooks to engage the beef and the pulleys themselves upon parallel tracks with a transporting track disposed between two storage tracks. In ordinary use the buyer passes between the two rows of meat suspended upon the storage track, selects the meat desired, and the meat, still suspended from the wheeled hook, is transferred from the storage track to the central transporting track where it is wheeled out of the place. Ordinarily the transferring of the meat from the storage to the transporting track is accomplished by laborers lifting the meat, requiring two or three laborers, depending upon the weight of the meat.

In Fig. 1 is shown in side elevation a storage track with a conventional beef suspended therefrom by means of a wheeled hook. The track is numbered as 10 and is supported in any approved manner as by hangers 11. Upon the track is shown a wheel or pulley 12 of the usual and ordinary construction, the wheel being disposed within the U-shaped portion 13 of the hanger being open at one side as at 14 to permit it to be removed from the track 10 and provided with a loop or ring 15 into which is hooked the hook inserted through the meat which is shown at 16.

At Fig. 2 a second storage track 10′ is shown supported by the hangers 11′ with a central transporting track 17 supported by similar hangers 18, it being understood, of course, that meat in large quantities is stored upon the two tracks 10 and 10′ by being supported on a large number of the trucks 13.

The present invention embodies a short length of track 19 having at opposite ends hooks 20 positioned and proportioned to hook over and bear upon one of the storage tracks 10 and 10′ and the central transporting track 17. Upon the short length of track 19 is mounted a wheel 21 flanged to maintain its position thereon and provided with a stirrup 22 with a swiveled ring 23 hanging from the under side of the stirrup. To the swiveled ring 23 a lever 24 is fulcrumed bent as at 25 to provide a downwardly extending handle portion 26 preferably with a brace 27 extending from the lever 24 to the handle 26 and provided with any approved form of hand hold shown conventionally at 28. The extremity of the lever 24 opposite the bend 25 is bifurcated as at 29 shown in detail at Fig. 5 and provided, for convenience, with reversely inclined extremities 30 to assist in passing such bifurcation over the shank 31 of the swivel loop 15. The extremity is also provided with a cut-out or depressed portion 32 positioned and proportioned to receive the cross bar 33 when the shank 31 is embraced by the bifurcated ends of such lever.

In operation when a piece of meat has been selected by the buyer the short length of track 19 is placed across over the storage and the transportation track adjacent such piece of meat and the shank 31 engaged by the extremity of the lever 24. A movement of the handle 26 toward the meat will cause a lifting of such meat to disengage the flanges of the roller 12 from the track whereupon the meat may be moved to clear the roller from the track, the roller then is let down so that it will pass under the storage track 10 and again lifted and placed in position upon the transportation track 17, the latter being accomplished by moving the roller 21 across the short length of track as may be found desirable.

By the employment of this invention a piece of meat ordinarily requiring the services of two or three laborers can be transferred from the storage to the transportation track by a single laborer with ease.

What we claim is:—

1. In a carcass shifting apparatus, the combination with two bars suspended in suitable proximity to each other, and a hanger, of a track adapted to be connected with the two bars to span the space between them, a trolley mounted on the track, a manipulating bar pivotally connected with the trolley, and a connection between the said bar and the hanger, whereby the latter may be supported in an upright position when detached from its supporting bar.

2. In apparatus of the class described, the combination with bars, supported in suitable proximity to each other, a hanger adapted to engage the said bars and having a depending bolt rigidly connected with its lower extremity, and a track whose extremities are fashioned to loosely engage the two bars, of a trolley mounted upon the track, and a manipulating arm pivotally connected with the trolley, the upper extremity of the said arm being provided with a hook adapted to engage the bolt of the hanger for the purpose set forth.

3. In apparatus of the class described, the combination with supporting bars, and a hanger, of a track removably connected with the bars and loosely engaging the same, whereby the track may be rocked on the bars, a trolley mounted on the track, a manipulating arm movably connected with the trolley, and a connection between the upper extremity of the arm and the hanger to support the latter in an upright position, when detached from this supporting bar.

4. The combination with adjacent tracks, of a member adapted to span the interval between the tracks, a depending member movable upon the spanning member, a lever formed with an engaging portion to engage the suspending member, said lever formed with a substantially right-angled handle portion to said engaging portion, a connecting member for bracing said engaging portion and said handle portion, and means carried by the lever for engaging a weight, said means arranged to be supported in an upright position when detached from its support.

5. The combination with adjacent tracks, of a track member adapted to engage adjacent tracks at its opposite ends, a carriage mounted and movable upon the last-mentioned track, a lever formed with a loop portion to engage with the carriage and means carried by the lever adapted to engage a weight, and a handle rigidly connected with the lever, said means arranged to be supported in an upright position when detached from its support.

6. The combination with adjacent tracks, of a short track extending between the adjacent tracks, a carriage mounted and movable upon the short track member, said carriage arranged to be supported in an upright position when detached from its support, a lever fulcrumed beneath the carriage and provided with a weight-engaging end formed with reversely inclined members projecting from the lever, and a handle member rigidly connected with the lever.

In testimony whereof we affix our signatures in presence of two witnesses.

AMOS B. TERRIL.
MICHAEL CANNING.

Witnesses:
ALBERT L. VOGL,
CARLE WHITEHEAD.

---

Copies of this patent may be obtained for five cents each, by addressing the "Commissioner of Patents, Washington, D. C."